(12) United States Patent
Jang

(10) Patent No.: US 11,606,593 B2
(45) Date of Patent: Mar. 14, 2023

(54) METHOD OF CONTROLLING SINK DEVICE, SOURCE DEVICE, AND HIGH-DEFINITION MULTIMEDIA INTERFACE (HDMI)

(71) Applicant: LG ELECTRONICS INC., Seoul (KR)

(72) Inventor: Eunkwang Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/472,489

(22) Filed: Sep. 10, 2021

(65) Prior Publication Data

US 2022/0394317 A1 Dec. 8, 2022

(30) Foreign Application Priority Data

Jun. 8, 2021 (KR) ........................ 10-2021-0073967

(51) Int. Cl.
*H04N 21/41* (2011.01)

(52) U.S. Cl.
CPC ............................... *H04N 21/4108* (2013.01)

(58) Field of Classification Search
None
See application file for complete search history.

(56) References Cited

U.S. PATENT DOCUMENTS

| | | | | |
|---|---|---|---|---|
| 2012/0166702 A1* | 6/2012 | Toba | ................... | G06F 13/4068 |
| | | | | 710/316 |
| 2014/0375878 A1* | 12/2014 | Kataoka | ............... | H04N 7/0125 |
| | | | | 348/441 |
| 2017/0092226 A1 | 3/2017 | Park et al. | | |
| 2020/0177857 A1 | 6/2020 | Oh | | |

FOREIGN PATENT DOCUMENTS

| | | | | |
|---|---|---|---|---|
| EP | 2230840 A2 * | 9/2010 | ............ | H04N 5/765 |
| JP | 2012199643 | 10/2012 | | |
| JP | 2020160227 | 10/2020 | | |
| KR | 1020070040094 | 4/2007 | | |
| WO | WO-2015137716 A1 * | 9/2015 | ........... | H04L 1/0045 |

OTHER PUBLICATIONS

PCT International Application No. PCT/KR2021/011602, Written Opinion of the International Searching Authority dated Mar. 3, 2022, 9 pages.

* cited by examiner

*Primary Examiner* — Omar S Parra
(74) *Attorney, Agent, or Firm* — Lee Hong Degerman Kang Waimey

(57) ABSTRACT

The present disclosure provides a method of controlling a high-definition multimedia interface (HDMI). The method includes: reading, by a source device, extended display identification data (EDID) of a sink device when the sink device and the source device are connected; writing information about the source device in a status and control data channel (SCDC) structure; and reading, by the source device, the EDID again based on a predetermined field value included in the SCDC structure.

19 Claims, 8 Drawing Sheets

FIG. 5

| Offset | R/W | Name | Description |
|---|---|---|---|
| 0x01 | R | Sink Version | Section 10.4.1.2 |
| 0x02 | R/W | Source Version | Section 10.4.1.2 |
| 0x10 | R/W | Update Flags | Section 10.4.1.3 |
| 0x11 | R/W | | |
| 0x20 | R/W | TMDS Configuration | Section 10.4.1.4 |
| 0x21 | R | TMDS Scrambler Status | Section 10.4.1.5 |
| 0x30 | R/W | Sink Configuration | Section 10.4.1.6 |
| 0x31 | R/W | | |
| 0x35 | R | Source Test Configuration | Section 10.4.1.6.1 |
| 0x40 | R | Status Flags | Section 10.4.1.7 |
| 0x41 | R | | |
| 0x42 | R | | |
| 0x50 | R | Channel 0 (Lane 0) Error Count bits 7 -> 0 | Sections 6.2, 6.6, and 10.4.1.8 |
| 0x51 | R | Channel 0 (Lane 0) Error Count bits 14 -> 8 | |
| 0x52 | R | Channel 1 (Lane 1) Error Count bits 7 -> 0 | Sections 6.2, 6.6, and 10.4.1.8 |
| 0x53 | R | Channel 1 (Lane 1) Error Count bits 14 -> 8 | |
| 0x54 | R | Channel 2 (Lane 2) Error Count bits 7 -> 0 | Sections 6.2, 6.6, and 10.4.1.8 |
| 0x55 | R | Channel 2 (Lane 2) Error Count bits 14 -> 8 | |
| 0x56 | R | Checksum of Character Error Detection | Sections 6.2, 6.6, and 10.4.1.8 |
| 0x57 | R | Lane 3 Error Count bits 7 -> 0 | Sections 6.6 and 10.4.1.8 |
| 0x58 | R | Lane 3 Error Count bits 14 -> 8 | |
| 0x59 | R | Reed Solomon Corrections Counter bits 7 -> 0 | Sections 6.5.4 and 10.4.1.8 |
| 0x5A | R | Reed Solomon Corrections Counter bits 14 -> 8 | |
| 0xC0 | R/W | Test Read Request | Sections 10.4.1.9 and 10.4.1.10 |
| 0xD0 | R | Manufacturer_OUI_1 | Section 10.4.1.10 |
| 0xD1 | R | Manufacturer_OUI_2 | Section 10.4.1.10 |
| 0xD2 | R | Manufacturer_OUI_3 | Section 10.4.1.10 |
| 0xD3-0xDD | R | Device ID: Device ID String | Section 10.4.1.10 |
| 0xDE-0xFF | R/W | ManufacturerSpecific | Section 10.4.1.10 |
| All Remaining Offsets | R | Reserved | Sinks shall return 0 |

FIG. 6

| offset | Bit7 | Bit6 | Bit5 | Bit4 | Bit3 | Bit2 | Bit1 | Bit0 | Note |
|---|---|---|---|---|---|---|---|---|---|
| 0xDE | Vendor_OUI_1 | | | | | | | | Vendor's IEEE_OUI, Third Octet. |
| 0xDF | Vendor_OUI_2 | | | | | | | | Vendor's IEEE_OUI, Second Octet. |
| 0xF1 | Vendor_OUI_3 | | | | | | | | Vendor's IEEE_OUI, First Octet. |
| 0xF2 | Device ID: Device_ID_String | | | | | | | | Device Identification String. Identifies the Sink Device. Up to eight ASCII characters starting at offset 0xF2. If less than eight characters are used, the unused bytes shall be set to 0x00. |
| 0xF3 | Device ID: Device_ID_String | | | | | | | | |
| 0xF4 | Device ID: Device_ID_String | | | | | | | | |
| 0xF5 | Device ID: Device_ID_String | | | | | | | | |
| 0xF6 | Device ID: Device_ID_String | | | | | | | | |
| 0xF7 | Device ID: Device_ID_String | | | | | | | | |
| 0xF8 | Device ID: Device_ID_String | | | | | | | | |
| 0xF9 | Device ID: Device_ID_String | | | | | | | | |
| 0xFA | FRL | FreeSync | G-Sync | VRR | QMS | FVA | DSC | Rsvd(0) | Source Capability, DolbyVision[8:7] "00" Not Support, "01" Std Only, "10" LL Only, "11" Std & LL, ='1' is Support, ='0' is not Support |
| 0xFB | DolbyVision | | DV-HFR | Rsvd(0) | 8K_VIC_Pre_sent | 4K-HFR_VI C_Present | Rsvd(0) | | |
| 0xFC | EDID_RR | | | | Rsvd(0) | | | | if set ='1', Request to read Sink EDID |
| 0xFD | Rsvd(0) | | | | | | | | |
| 0xFE | Rsvd(0) | | | | | | | | |
| 0xFF | Rsvd(0) | | | | | | | | |

601

METHOD OF CONTROLLING SINK DEVICE, SOURCE DEVICE, AND HIGH-DEFINITION MULTIMEDIA INTERFACE (HDMI)

CROSS-REFERENCE TO RELATED APPLICATION(S)

Pursuant to 35 U.S.C. § 119(a), this application claims the benefit of earlier filing date and right of priority to Korean Patent Application No. 10-2021-0073967, filed on Jun. 8, 2021, the contents of which are all hereby incorporated by reference herein in its entirety.

BACKGROUND

Field

The present disclosure relates to a method of controlling a sink device and a source device through a high-definition multimedia interface (HDMI). More particularly, the present disclosure relates to a method of transmitting and receiving data between a source device and a sink device through an HDMI and controlling the data transmission and reception.

Discussion of the Related Art

In recent years, digital image display devices capable of displaying high-quality images have been widely used. In particular, display devices such as an organic light-emitting diode (OLED) television (TV) that uses an OLED as a light emitting device and a liquid crystal display (LCD) TV in which pixels are arranged in front of a light emitting body or reflector may display high-definition images The use of these display devices in connection with input devices (e.g., set-top box (STB), Xbox, Nintendo, etc.) has increased, and a digital visual interface (DVI) or high-definition multimedia interface (HDMI) has been used as a digital interface for data transmission between the devices.

The HDMI is a multimedia interface for transmitting uncompressed full digital audio/video signals through a single cable and provides an interface between a source device such as an audio/video source, an STB, Xbox, etc. and a sink device such as a monitor, a digital TV, etc.

A device that transmits audio and video signals to a sink device such as a digital TV through the digital interface of HDMI is called a digital interface device. The digital interface device may include not only various digital video disc (DVD) devices but also STBs, VTRs, and game consoles.

In the prior art, when a source device is connected to a sink device, the source device only reads extended display identification data (EDID) of the sink device, and there was no ways for the sink device to know information on the source device.

SUMMARY OF THE DISCLOSURE

Accordingly, the present disclosure is directed to a method of controlling a sink device, a source device, and a high-definition multimedia interface (HDMI) that substantially obviates one or more problems due to limitations and disadvantages of the related art.

The object of the present disclosure is to address the aforementioned and other problems.

The present disclosure aims to obtain information on a source device connected to a sink device through a high-definition multimedia interface (HDMI).

Specifically, the present disclosure aims to efficiently manage extended display identification data (EDID) through information acquisition and data exchange between the source device and sink device, which are connected by the HDMI.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling an HDMI may include: reading, by a source device, EDID of a sink device when the sink device and the source device are connected; writing information about the source device in a status and control data channel (SCDC) structure; and reading, by the source device, the EDID again based on a predetermined field value included in the SCDC structure.

The method may further include checking, by the sink device, vendor information on the source device based on the written information about the source device.

The method may further include updating, by the sink device, the EDID based on the vendor information.

The method may further include controlling, by the sink device, a display of the sink device based on the written information about the source device.

The method may further include disabling, by the sink device, unnecessary operations in the connection with the source device based on the written information about the source device.

The method may further include detecting, by the sink device, whether the information about the source device is written in the SCDC structure at a predetermined periodicity.

Reading, by the source device, the EDID of the sink device may further include checking, by the source device, a manufacturer identifier (ID) of the sink device.

The information about the source device may include capability information on the source device.

The method may further include, when the EDID is updated, storing, by the source device, new EDID in a memory.

In another aspect of the present disclosure, a sink device for use in connection with an HDMI cable is provided. The sink device may include an HDMI receiver and a controller. The controller may be configured to: when connected to a source device through the HDMI receiver, detect whether the source device writes information about the source device in an SCDC structure; and when the source device writes the information about the source device in the SCDC structure, check vendor information on the source device based on the written information about the source device.

In a further aspect of the present disclosure, a source device for use in connection with an HDMI cable is provided. The source device may include an HDMI transmitter and a controller. The controller may be configured to: when connected to a sink device through the HDMI transmitter, read EDID of the sink device; write information about the source device in an SCDC structure; and read the EDID of the sink device again based on a predetermined field value included in the SCDC structure.

It is to be understood that both the foregoing general description and the following detailed description of the present disclosure are exemplary and explanatory and are intended to provide further explanation of the disclosure as claimed.

As it is apparent from the above description, the present disclosure has the following effects.

According to at least one embodiment of the present disclosure, a sink device may provide EDID optimized for a source device, thereby managing the EDID effectively.

According to at least one embodiment of the present disclosure, the sink device may update the EDID based on information about the source device to control the source device.

According to at least one embodiment of the present disclosure, the sink device may disable unnecessary user experience (UX) operations based on the information about the source device.

According to at least one embodiment of the present disclosure, the source device may read the EDID with no Hot Plug Detect (HPD) toggle.

The additional applicability of the present disclosure will become apparent from the detailed description given hereinafter. However, it should be understood that the detailed description and specific examples such as preferred embodiments of the present disclosure are given by way of illustration only, since various changes and modifications within the spirit and scope of the present disclosure will become apparent to those skilled in the art from this detailed description.

It will be apparent to those skilled in the art that various modifications and variations may be made in the present disclosure without departing from the spirit and scope of the disclosure. Thus, it is intended that the present disclosure cover the modifications and variations of this disclosure provided they come within the scope of the appended claims and their equivalents.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 5 is a diagram illustrating a status and control data channel (SCDC) structure according to an embodiment of the present disclosure.

FIG. 6 is a diagram for explaining a ManufacturerSpecific field of the SCDC structure according to an embodiment of the present disclosure.

DETAILED DESCRIPTION OF THE DISCLOSURE

Figure 1:
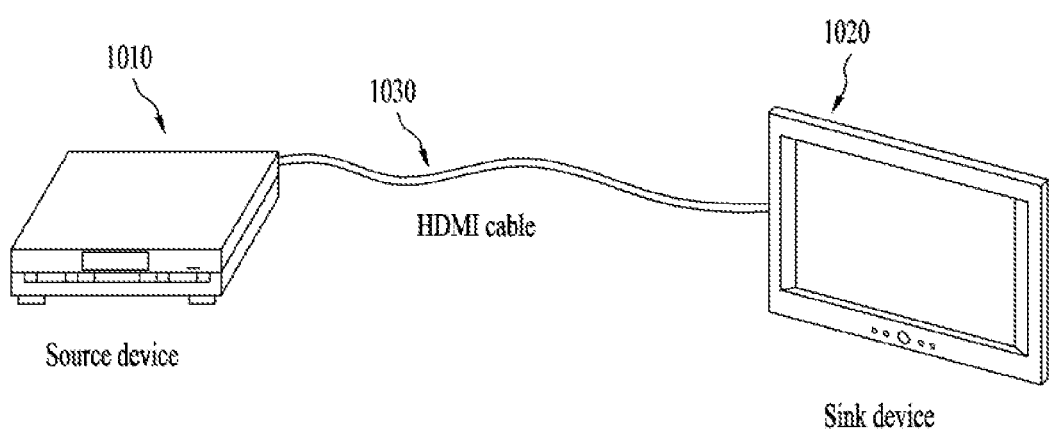
FIG. 1 is a view illustrating a source device and a sink device connected by a high-definition multimedia interface (HDMI) cable according to an embodiment of the present disclosure.

Hereinafter, embodiments of the present disclosure will be described in detail with reference to the attached drawings. In this specification, the same or equivalent components will be provided with the same reference numbers, and description thereof will not be repeated. The suffixes "module" and "unit" of elements herein are used for convenience of description and thus may be used interchangeably and do not have any distinguishable meanings or functions. If it is determined that detailed descriptions of the related art obscure the gist of the present disclosure, the detailed descriptions will be omitted. It should also be understood that the attached drawings are merely to provide better understanding of the embodiments of the present disclosure and the spirit of the present disclosure is not limited to the attached drawings. Thus, the present disclosure should be construed to extend to any alterations, equivalents and substitutes in addition to those which are particularly set out in the accompanying drawings.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well unless the context clearly indicates otherwise.

In addition, it will be understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

The present disclosure proposes a technology for controlling a display device such as an organic light-emitting diode/light-emitting diode (OLED/LED) television (TV) and a monitor, that is, a source device, which is connected to a sink device by a high-definition multimedia interface (HDMI), through acquisition of capability information on the source device and data exchange with the source device.

The HDMI may operate based on information about the sink device, which is obtained by the source device by reading extended display identification data (EDID) through HPD toggle. However, in the related art, the sink device may not obtain the capability information on the source device.

The sink device may require a specific control operation depending on source devices. However, the conventional consumer electronics control (CEC) and packet operation provides only limited functions within the range of HDMI capability. In particular, the following problems may exist: too many features are provided at once and EDID has space constraints and compatibility.

Accordingly, the present disclosure proposes a method by which a sink device provides optimized EDID to a source device to efficiently manage the EDID.

FIG. 1 is a view illustrating a source device and a sink device connected by an HDMI cable according to an embodiment of the present disclosure.

In FIG. 1, a source device 1010 is shown as an example of a source device, a sink device 1020 is shown as an example of a sink device, and an HDMI cable 1030 is shown as an example of a digital interface cable.

The source device may include various image signal output devices such as a set-top box (STB), a cable receiving device, a satellite broadcast receiving device, and a personal computer. The sink device may include various image display devices such as a digital TV, a monitor, and a projector. The digital interface cable may include a digital visual interface (DVI) cable in addition to the HDMI cable.

In recent years, with the advent of various multimedia contents, various multimedia devices for playing and transmitting the various multimedia contents have been developed together. In addition, interface technologies have also been developed to provide signal connections therebetween easily and with no loss. Among the interface technologies, an HDMI is the most representative multimedia interface.

The HDMI is an interface/standard for electronic products, which is developed from the DVI, an interface standard for personal computers and displays. Since the HDMI delivers video/audio from a player to a display device without compression, the HDMI has almost no latency between the sink device and the sink device. In addition, the HDMI has high format compatibility because no decoder chip or software is required.

Since the HDMI is capable of processing digital video and audio at 5 Gbps without compression, the HDMI has the following advantages: the HDMI has a simple circuit, there is no quality degradation, copyright protection of contents by HDCP (High-bandwidth Digital Content Protection) is supported, and a single cable connection is allowed. In addition, since the HDMI is compatible with the DVI, which is widely used in the computer industry, HDMI applications are developing day by day.

On the other hand, the HDMI standard defines the consumer electronics control (CEC) and CEC bus capable of simply controlling a plurality of multimedia devices connected on a network. According to the CEC, one device is capable of simply controlling multimedia devices connected through the HDMI without separate control thereof, and thus, a user may easily link the devices.

Hereinafter, a case in which the HDMI cable is connected as a digital interface is assumed.

Figure 2:
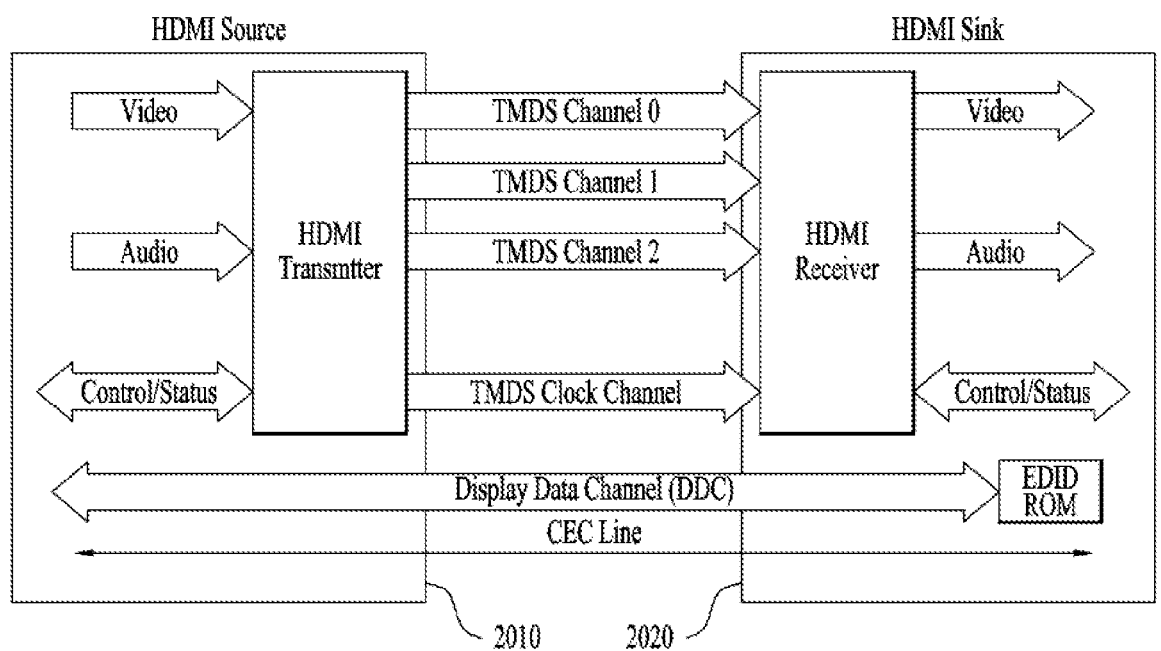
FIG. 2 is a block diagram illustrating an HDMI system including an HDMI source device 2010 and an HDMI sink device 2020 according to an embodiment of the present disclosure.

FIG. 2 is a block diagram illustrating an HDMI system including an HDMI source device 2010 and an HDMI sink device 2020 according to an embodiment of the present disclosure.

The HDMI includes three independent communication channels: a transition minimized differential signaling (TMDS) channel; a display data channel (DDC); and a CEC channel, through which audio/video data, device information, and control commands may be transmitted and received.

The HDMI source device 2010 transmits video and audio signals included in a moving image signal to the HDMI sink device 2020 over the TMDS channel. The HDMI sink device 2020 receives the video and audio signals transmitted over the TMDS channel while storing standard information in an EDID read-only memory (ROM). The TMDS channel supports data transmission at 5 Gbps or less and is responsible for transmitting and receiving video and audio signals.

The HDMI source device 2010 may obtain detailed information stored in the EDID ROM of the HDMI sink device 2020 over the DDC channel and then transmit video and audio signals optimized for the HDMI sink device 2020. The DDC channel has a function of implementing an optimal screen by referring to standard information about the HDMI source device 2010. Here, the standard information may correspond to data communication standards defined by Video Electronics Standards Association (VESA), which is an international standard organization. Specifically, the HDMI source device 2010 may obtain the detailed information about the HDMI sink device 2020 from EDID output by the HDMI sink device 2020 over the DDC channel. Based on the detailed information, the HDMI source device 2010 may convert media data according to the display environment of the HDMI sink device 2020 and send the converted media data to the HDMI sink device 2020 over the TMDS channel. The EDID may include, for example, a manufacturer identifier (ID) indicating a manufacturing company, a product ID indicating a product model, information on functions supported by a display device, timing information, and so on.

The HDMI source device 2010 and the HDMI sink device 2020 may exchange control commands on the CEC channel. The CEC channel is an additional protocol for performing high-level control functions in the HDMI.

The HDMI sink device 2020 may include various digital broadcast devices that support an HDMI-CEC function. The HDMI-CEC function refers to a function of controlling CEC-based products through the HDMI. The HDMI-CEC function is an optional function of the HDMI. For example, the HDMI-CEC function may include the following functions for the CEC-based products: automatic power-on, automatic signal routing, and single-point remote control.

According to the present disclosure, the HDMI source device 2010 and the HDMI sink device 2020 may exchange information on resolution and error occurrence over the CEC channel, thereby configuring the optimal resolution. Hereinafter, the HDMI source device 2010 and the HDMI sink device 2010 may be referred to as an HDMI transmitter and an HDMI receiver, respectively.

Figure 3:
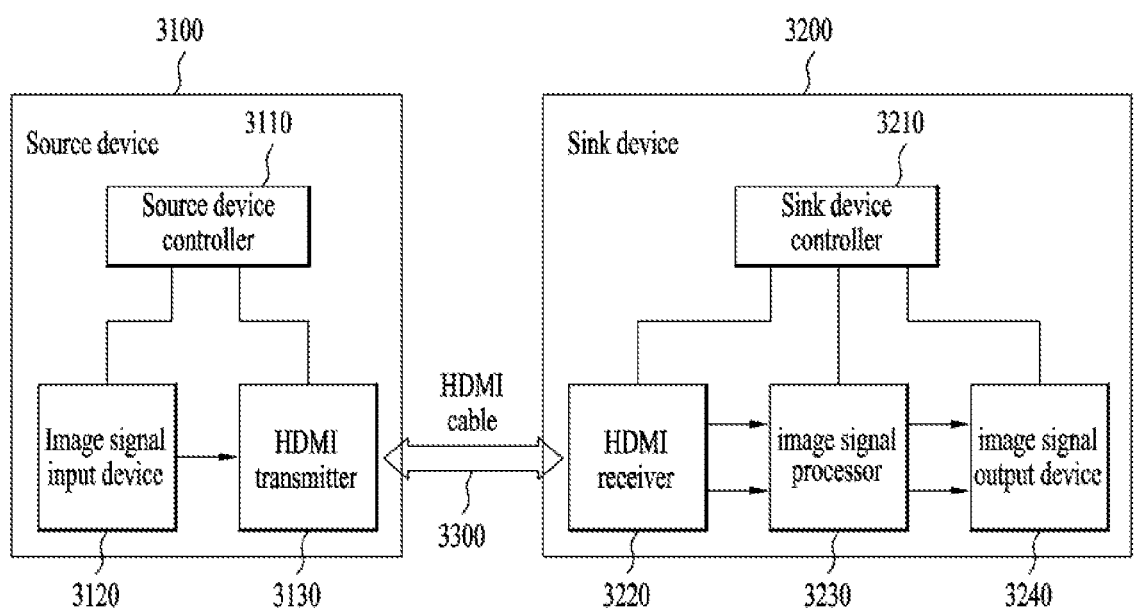
FIG. 3 is a block diagram illustrating a source device and a sink device according to an embodiment of the present disclosure.

FIG. 3 is a block diagram illustrating a source device and a sink device according to an embodiment of the present disclosure.

As described above, a source device 3100 may include various image signal output devices such as a digital video disc (DVD) player, an STB, a cable receiving device, a satellite broadcast receiving device, a personal computer, and so on. A sink device 3200 may include various image display devices such as a digital TV, a monitor, a projector, and so on. A HDMI cable 3300 may include a CEC line.

In an embodiment according to the present disclosure, the source device 3100 may include a source device controller 3110, an image signal input device 3120, and an HDMI transmitter 3130. The image signal input device 3120 may receive and process video, audio, and data content such as an MPEG stream and send the video, audio, and data content to the HDMI transmitter 3130. The HDMI transmitter 3130 may transmit a signal including video, audio, and data content (such a signal may also be referred to as an image signal) to the sink device 3200 through the HDMI cable 3300.

The sink device 3200 may include a sink device controller 3210, an HDMI receiver 3220, an image signal processor 3230, and an image signal output device 3240. The HDMI receiver 3220 may receive an image signal through the HDMI cable 3300 and send the image signal to the image signal processor 3230. The image signal processor 3230 may perform signal processing on the image signal and transmit the processed signal to the image signal output device 3240. The image signal output device 3240 may output the processed image signal to a user.

Hereinafter, embodiments in which the above-described source device and sink device are connected through the HDMI will be described. That is, the details of the above-described source device, sink device, and HDMI may be applied.

Figure 4:
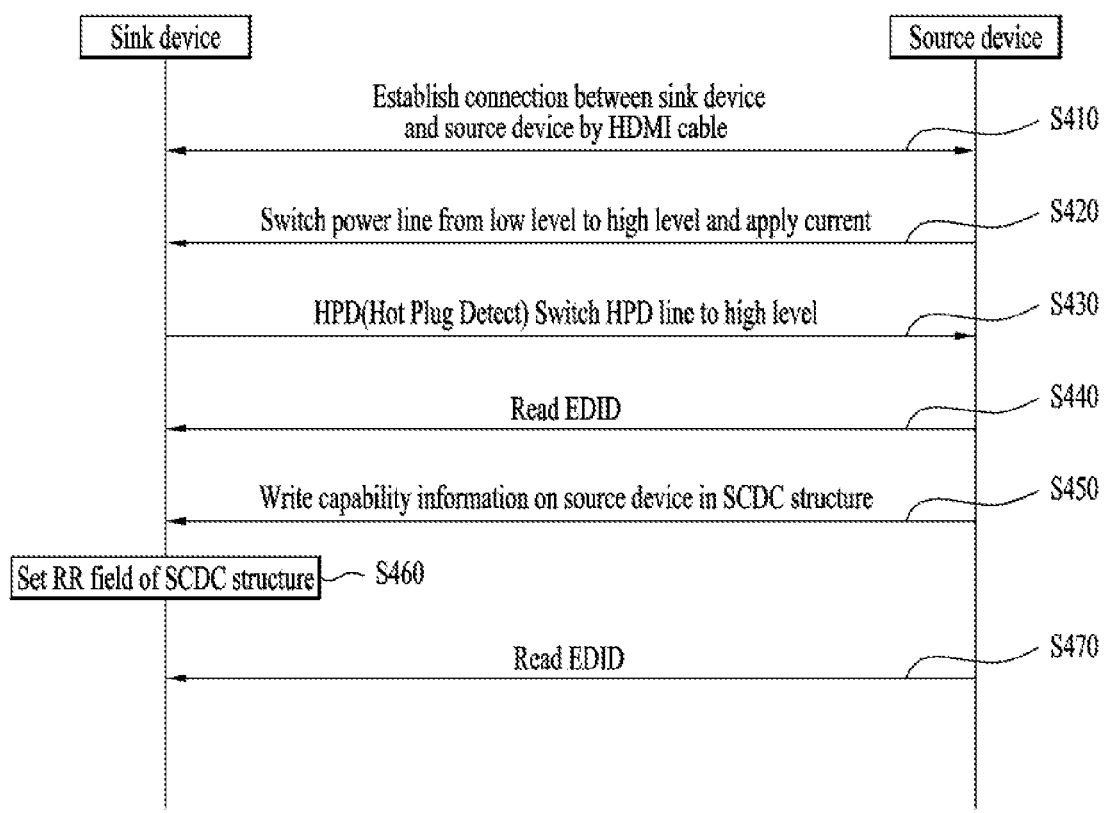
FIG. 4 is a flowchart for explaining a method of controlling an HDMI according to an embodiment of the present disclosure.

FIG. 4 is a flowchart for explaining a method of controlling the HDMI according to an embodiment of the present disclosure.

In step S410, the sink device and the source device may be connected by the HDMI cable.

In step S420, the source device may switch a power line of 5 V from a low level to a high level and apply a current after the HDMI cable is connected.

In step S430, the sink device may switch an HPD line to a high level. By doing so, the sink device may inform the source device that the HDMI cable is normally connected and an EDID-related circuit is enabled so that the source device is allowed to access EDID information.

In step S440 after steps S420 and S430, the source device may read the EDID. In this case, the sink device may include various information about the sink device in the EDID and transmit the EDID to the source device. The source device may read the EDID and check the information about the sink device. In an embodiment of the present disclosure, the source device may check the manufacture ID of the sink device by reading the EDID of the sink device. Details thereof will be described later with reference to FIG. 5.

Steps S410 to S440 may be performed immediately after the sink device and the source device are connected by the HDMI cable. Steps S410 to S440 may be the same as those in the prior art.

The present disclosure will be described in detail with reference to steps S450 to S470.

In step S450, the source device may write capability information on the source device in a status and control data channel (SCDC) structure. Details thereof will be described later with reference to FIG. 6. According to an embodiment of the present disclosure, the sink device may check whether information about the source device is written in the SCDC structure at a predetermined periodicity.

In step S460, the sink device may set the value of a predetermined field in the SCDC structure. Specifically, the sink device may set an RR field of the SCDC structure. Details thereof will be described later with reference to FIG. 6.

In an embodiment of the present disclosure, the sink device may check vendor information on the source device based on the capability information on the source device, which is written by the source device in the SCDC structure. Thereafter, the sink device may update the EDID based on the vendor information on the source device. The sink device may control the display (the image signal output device of FIG. 3) of the sink device based on the written capability information on the source device. The sink device may disable unnecessary operations in connection with the source device based on the written capability information on the source device.

In step S470, the source device may read the EDID of the sink device again. Specifically, the source device may read the EDID again based on the value of the RR field of the SCDC structure. When the EDID is updated, the source device may store new EDID in the memory.

FIG. 5 is a diagram illustrating an SCDC structure according to an embodiment of the present disclosure.

The SCDC is added with the update to HDMI standard 2.0. The SCDC is a peer-to-peer communication channel based on I2C (DDC). This protocol provides a mechanism for a sink device (I2C slave) to request a source device (I2C master) to initiate a status check read to exchange data between the sink and source devices.

That is, the SCDC is a one-to-one communication protocol based on I2C serial communication that enables data exchange between the HDMI source device and the HDMI sink device. The SCDC includes a mechanism in which the sink device corresponding to the I2C slave requests a status check read from the source device corresponding to the I2C master and the source device reads the corresponding status from the sink device upon receiving the request.

If the sink device supports the SCDC, the sink device needs to set SCDC_Present in HF-VSDB or SCDB of the EDID. If SCDC_Present is '1', the source device needs to access an SCDC register.

The SCDC structure is stored in the memory of the sink device and may include data similar to the structure shown in FIG. 5. In FIG. 5, R/W denotes whether the source device is capable of only reading or both reading/writing SCDC-structure-based data stored in the sink device.

The following fields are included in the SCDC structure of FIG. 5.

Sink Version field: This field may indicate whether the SCDC structure is compliant and provide version information about the sink device.

Source Version field: This field may indicate whether the SCDC structure is compliant. If the sink device reads EDID from the sink device and if SCDC_Present of the EDID is set to '1', the Source Version field of the SCDC structure is set to '1'.

Update Flags (Update_0, Update_1) field: If there is a change in information (Status, Character Error Detect, etc.) that the sink device needs to provide to the source device, the corresponding bit is set to '1'.

TMDS Configuration (TMDS_Config) field: If each of TMDS_Bit_Clock_Ratio and Scrambling_Enable occupies one bit and if the source device attempts to enable the scrambling function of the sink device, the corresponding bit is set to '1'.

Scrambler Status field: If the sink device detects a scrambled control code sequence, the corresponding bit is set to '1'.

Configuration (Config_0) field: This field is used to configure capability information on the source and sink devices.

Status Flags (Status_Flag_0, Status_Flag_1) field: This filed indicates whether data received through a clock and channels 0, 1, and 2 is successfully decoded.

In HDMI standard 2.1, a ManufacturerSpecific field 501 is included in the SCDC structure. In this case, the ManufacturerSpecific field 501 in the SCDC structure may include the definition of a vendor. According to an embodiment of the present disclosure, whether the ManufacturerSpecific field 501 is capable of being read or both read and written may be determined by the vendor. According to an embodiment of the present disclosure, 34 bytes may be allocated to the ManufacturerSpecific field 501.

In an embodiment of the present disclosure, the sink device may obtain the capability information on the source device. How the sink device obtains the capability information on the source device will be described reference to FIGS. 6 to 8.

FIG. 6 is a diagram for explaining the ManufacturerSpecific field of the SCDC structure according to an embodiment of the present disclosure.

Referring to FIG. 6, the source device may exchange the capability information through the ManufacturerSpecific field, which is designated as an offset for the definition of the vendor in the SCDC structure. However, the information in the field of FIG. 6 is merely an example, and it is apparent that other offsets and bits may be defined.

In an embodiment of the present disclosure, the source device may read the EDID of the sink device. In this case, the source device may write the ManufacturerSpecific field in the SCDC structure of the sink device. Similarly, the sink device may set an EDID_RR field 601 to '1' in the SCDC structure if the capability information on the source device is written in the ManufacturerSpecific field.

In other words, the sink device may provide the EDID optimized for the connected source device by defining an EDID read request (RR) in the ManufacturerSpecific field.

According to the current specifications, the source device could update the EDID of the sink device only through HPD toggle. However, according to an embodiment of the present disclosure, the source device may read the EDID with no HPD toggle according to the request from the sink device through the ManufacturerSpecific field.

In an embodiment of the present disclosure, the source device may monitor a 0xFC field 601 (monitoring and polling). Accordingly, when the value of the EDID_RR field 601 is set to '1', the source device may read the EDID of the sink device again.

In an embodiment of the present disclosure, the sink device may update the EDID of the sink device based on the capability information on the source device and control the mode and brightness of the image signal output device according to the SCDC structure shown in FIG. 6.

In an embodiment of the present disclosure, the sink device may disable unnecessary user experience (UX) operations in connection with the source device based on the capability information on the source device.

For example, if the source device does not support FreeSync, the sink device may disable the FreeSync ON/OFF menu on the UX of the sink device.

For example, if the source device does not support Dolby Vision, the sink device may delete DV-VSVDB from the EDID and request the source device to read again the EDID from which DV-VSVDB is deleted.

For another example, if the source device does not support FreeSync, the sink device may delete FS-VSDB from the EDID and request the source device to read again the EDID from which FS-VSDB is deleted.

Since various source devices using the HMDI may or may not support FreeSync or DVLL (Dolby Vision Low-Latency), the sink device needs to reflect DV-VSVDB in the EDID.

According to an embodiment of the present disclosure, such a problem may be solved.

Figure 7:
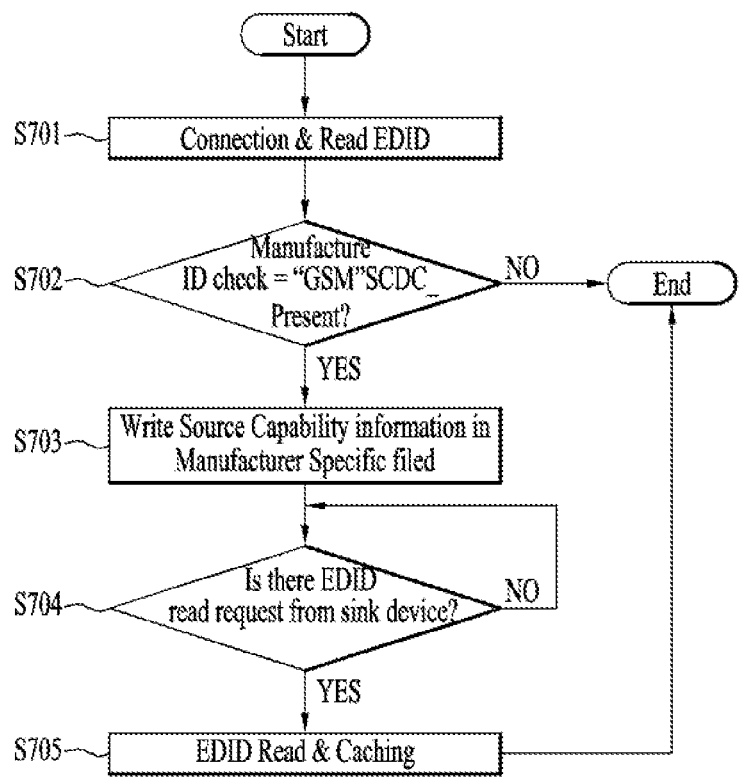
FIG. 7 is a flowchart illustrating operations of a source device according to an embodiment of the present disclosure.

FIG. 7 is a flowchart illustrating operations of the source device according to an embodiment of the present disclosure.

In step S701, when the source device is connected to the sink device by the HDMI, the source device may read EDID. In this case, the connection between the source device and the sink device may be established as described above in FIG. 4.

In step S702, the source device may check the manufacturer ID of the sink device. Specifically, the source device may check that the manufacturer ID of the sink device is a specific vendor. For example, the source device may check that the manufacturer ID is "GSM (Gold Star Manufacture)". In addition, the source device may check whether the SCDC exists. Specifically, the source device may check whether "SCDC_Present" exists.

In step S703, the source device may write capability information on the source device in the ManufacturerSpecific field of the SCDC structure. Specifically, when the manufacturer ID of the sink device is checked and the SCDC structure exists, the source device may write the capability information on the source device in the ManufacturerSpecific field of the SCDC structure.

In step S704, the source device may poll an EDID RR from the sink device. Specifically, the source device may monitor the EDID RR field value of the SCDC structure. In this case, the source device may monitor the EDID RR field value at a predetermined periodicity. That is, when the capability information on the source device is written in the ManufacturerSpecific field, the sink device may set the EDID RR field value to '1' and request the source device to read the EDID. Accordingly, the source device may monitor the EDID RR field value and check whether the EDID RR field value is set to '1'.

In step S705, the source device may read the EDID again and store the EDID in the memory. Specifically, when the EDID is updated, the source device may read new EDID again and store the new EDID in the memory. When the EDID RR field value is set to '1', the source device may read and cache the EDID.

Figure 8:
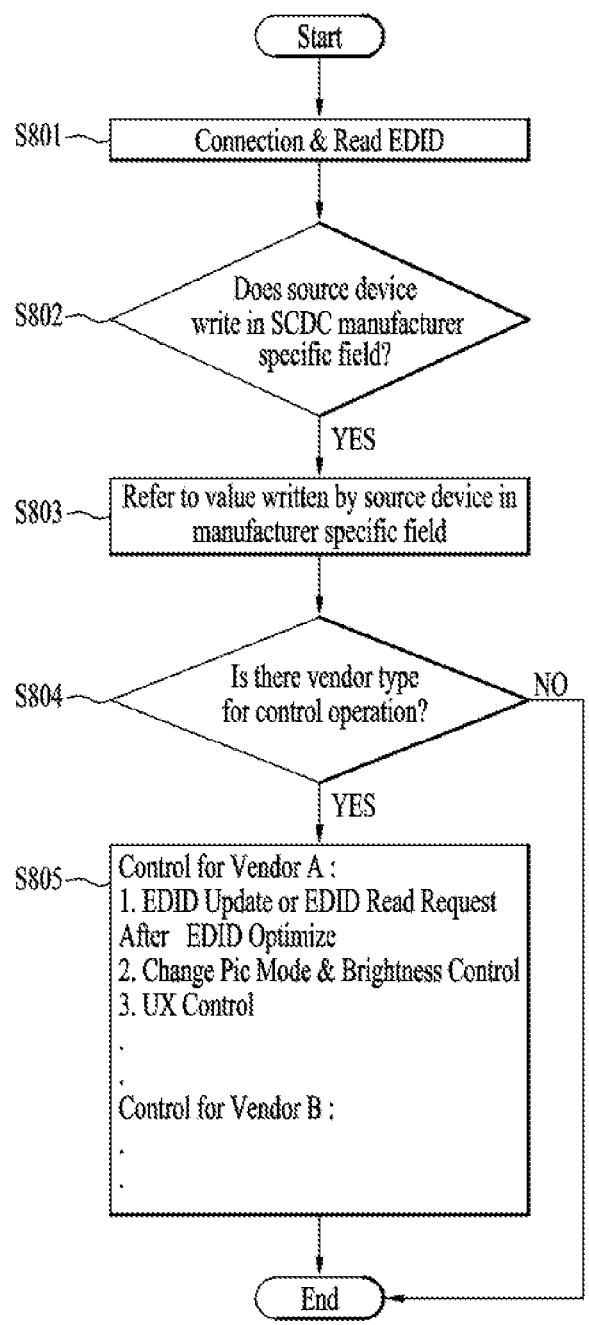
FIG. 8 is a flowchart illustrating operation of a sink device according to an embodiment of the present disclosure.

FIG. 8 is a flowchart illustrating operation of the sink device according to an embodiment of the present disclosure.

In step S801, the sink device may be connected to the source device by the HDMI. In this case, the sink device and the source device may be connected according to the above-described embodiment.

In step S802, the sink device may detect whether the source device is written in the ManufacturerSpecific field of the SCDC structure. In one embodiment of the present disclosure, the sink device may detect whether the source device is written as follows: the sink device may perform the detection continuously (interrupt method) or at a predetermined periodicity (polling method).

In step S803, the sink device may refer to the value written in the ManufacturerSpecific field by the source device. In an embodiment of the present disclosure, the sink device may check vendor information on the source device.

In step S804, the sink device may check whether the value written by the source device is a vendor type for control operation.

If the value written by the source device in step S804 is a predetermined vendor type, the sink device may control various functions based on the vendor type in step S805. In an embodiment of the present disclosure, the sink device may update the EDID based on the vendor type. After the EDID is optimized, the sink device may request a read from the source device. The sink device may change picture mode and adjust brightness based on the vendor type. Further, the sink device may control UX based on the vendor type.

Specifically, the sink device may update the EDID. After the EDID is optimized, the sink device may request the source device to read the EDID. For example, if vendor A supports DV-LL only with 4K HFR, the sink device may change the record that current DV-VSVDB supports up to 4K 60p and DV-Std and DV-LL are supported as follows: DV-VSVDB is DV-LL only with 4K HFR. Further, when vendor A supports no FreeSync, the sink device may delete existing FS-VSDB (14 bytes).

The sink device may change the picture mode of the display and control the brightness. For example, when vendor A is PC GPU, the sink device may change the picture mode of the display and control the brightness according to the PC GPU. Similarly, when vendor A is a game console, the sink device may switch the picture mode of the display to game mode according to the game console. That is, the sink device may control the display according to the vendor type.

The sink device may control UX/UI (user interface) operation. For example, when vendor A does not support FreeSync, the sink device may disable UX/UI related to FreeSync when vendor A is connected.

Accordingly, the sink device may provide and manage the EDID optimized for the source device.

The present disclosure may be implemented in a program-recorded medium as computer-readable codes. The computer-readable media may include all kinds of recording devices in which data readable by a computer system are stored. The computer-readable media may include hard disk drive (HDD), solid state disk (SSD), silicon disk drive (SDD), ROM, RAM, CD-ROM, magnetic tapes, floppy disks, optical data storage devices, and so on. In addition, the computer-readable media may include carrier-wave type implementations (e.g., transmission via Internet). Further, the computer may include the control unit 180 of the terminal device. Therefore, the above-mentioned embodiments are to be construed in all aspects as illustrative and not restrictive. The scope of the present disclosure should be determined by reasonable interpretation of the appended claims. In addition, the present disclosure covers the modifications and variations of this disclosure that come within the scope of the appended claims and their equivalents.

As is apparent from the above description, the present disclosure has the following effects.

According to at least one embodiment of the present disclosure, a sink device may provide EDID optimized for a source device, thereby managing the EDID effectively.

According to at least one embodiment of the present disclosure, the sink device may update the EDID based on information about the source device to control the source device.

According to at least one embodiment of the present disclosure, the sink device may disable unnecessary UX operations based on the information about the source device.

According to at least one embodiment of the present disclosure, the source device may read the EDID with no HPD toggle.

The additional applicability of the present disclosure will become apparent from the detailed description given hereinafter. However, it should be understood that the detailed description and specific examples such as preferred embodiments of the present disclosure are given by way of illustration only, since various changes and modifications within the spirit and scope of the present disclosure will become apparent to those skilled in the art from this detailed description.

It will be apparent to those skilled in the art that various modifications and variations may be made in the present disclosure without departing from the spirit and scope of the disclosure. Thus, it is intended that the present disclosure cover the modifications and variations of this disclosure provided they come within the scope of the appended claims and their equivalents.

What is claimed is:

1. A method of controlling a high-definition multimedia interface (HDMI), the method comprising:
    reading, by a source device, extended display identification data (EDID) of a sink device based on the sink device being connected to the source device by an HDMI cable;
    writing information about the source device in a Manufacturer Specific field of Status and Control Data Channel (SCDC) structure;
    setting, by the sink device, an EDID_RR field of the SCDC structure value '1'; and
    reading, by the source device, the EDID again in response to writing a specific value in the Manufacturer Specific field of the SCDC structure.

2. The method of claim 1, further comprising checking, by the sink device, vendor information about the source device based on the written information about the source device.

3. The method of claim 2, further comprising updating, by the sink device, the EDID based on the vendor information.

4. The method of claim 2, further comprising controlling, by the sink device, a display of the sink device based on the written information about the source device.

5. The method of claim 2, further comprising disabling, by the sink device, an operation in the connection with the source device based on the written information about the source device.

6. The method of claim 1, further comprising detecting, by the sink device, whether the information about the source device is written in the SCDC structure at a predetermined periodicity.

7. The method of claim 1, comprising checking, by the source device, a manufacturer identifier (ID) of the sink device.

8. The method of claim 1, wherein the information about the source device comprises capability information on the source device.

9. The method of claim 1, further comprising storing, by the source device, new EDID in a memory based on the EDID is updated.

10. A sink device for use in connection with a high-definition multimedia interface (HDMI) cable, the sink device comprising:
    an HDMI receiver; and
    a controller,
    wherein the controller is configured to:
    detect whether a source device writes information about the source device in a Manufacturer Specific field of Status and Control Data Channel (SCDC) structure after the sink device is connected to the source device through the HDMI receiver;
    set an EDID_RR field of the SCDC structure value '1'; and
    check vendor information about the source device based on written information about the source device, wherein the written information is written when the source device writes the information about the source device in the Manufacturer Specific field of the SCDC structure.

11. The sink device of claim 10, further comprising updating extended display identification data (EDID) based on the vendor information.

12. The sink device of claim 10, further comprising controlling a display of the sink device based on the written information about the source device.

13. The sink device of claim 10, further comprising disabling an operation in the connection with the source device based on the written information about the source device.

14. The sink device of claim 10, further comprising detecting whether the information about the source device is written in the SCDC structure at a predetermined periodicity.

15. The sink device of claim 10, wherein the information about the source device comprises capability information on the source device.

16. A source device for use in connection with a high-definition multimedia interface (HDMI) cable, the source device comprising:
  an HDMI transmitter; and
  a controller, wherein the controller is configured to:
    read extended display identification data (EDID) of a sink device based on the source device being connected to a sink device through the HDMI transmitter;
    write information about the source device in a Manufacturer Specific field of Status and Control Data Channel (SCDC) structure; and
    read the EDID of the sink device again based on a value '1' of an EDID_RR field of the SCDC structure.

17. The source device of claim 16, wherein the controller is further configured to check a manufacturer identifier (ID) of the sink device.

18. The source device of claim 16, wherein the information about the source device comprises capability information on the source device.

19. The source device of claim 16, wherein the controller is further configured to store new EDID in a memory based on the EDID being updated.

* * * * *